United States Patent [19]

Schmidt

[11] Patent Number: 5,355,662
[45] Date of Patent: Oct. 18, 1994

[54] SINGLE BAIL SELF-PROPEL AND ZONE BRAKE CONTROL

[75] Inventor: Larry W. Schmidt, Farmington, Minn.

[73] Assignee: The Toro Company, Bloomington, Minn.

[21] Appl. No.: 21,273

[22] Filed: Feb. 22, 1993

[51] Int. Cl.$^5$ .............................. A01D 69/00
[52] U.S. Cl. ........................... 56/11.3; 56/11.8; 180/19.3
[58] Field of Search ............... 56/10.5, 10.8, 11.3, 56/11.6, 11.7, 11.8; 74/480 R; 192/0.094; 180/19.3

[56] References Cited

U.S. PATENT DOCUMENTS

| | | | |
|---|---|---|---|
| 4,327,539 | 5/1982 | Bricko et al. | 56/113 |
| 4,704,847 | 11/1987 | Greider et al. | 56/10.5 |
| 4,930,369 | 6/1990 | Barnard et al. | 56/10.8 X |
| 5,086,890 | 2/1992 | Turczyn et al. | 192/1.44 |
| 5,088,273 | 2/1992 | Braun et al. | 56/10.5 |
| 5,261,214 | 11/1993 | Wallersheim | 56/11.7 X |

FOREIGN PATENT DOCUMENTS 2904021 8/1979 Fed. Rep. of Germany ....... 56/11.8

OTHER PUBLICATIONS

Toro Operator's Manual, Form No. 3312-248 Revision A, copyright 1983 to the Toro Company.
Toro Operator's Manual, Form No. 3314-941, copyright to The Toro Company in 1991.

Primary Examiner—David J. Bagnell
Attorney, Agent, or Firm—Donald S. Trevarthen

[57] ABSTRACT

A lawn mower self-propel and zone brake control system includes a deck, a ground engaging wheel rotatably coupled to and supporting the deck, a handlebar assembly coupled to the deck, and a transmission coupled to the ground engaging wheel. A pivoting control bail is pivotally mounted on the handlebar assembly and pivots between first and second positions. A power transmitting device connects an engine and the transmission. A zone brake is operatively coupled to the engine and the pivoting control bail and operates in either a first or a second mode wherein the zone brake inhibits rotational movement of and power generation by the engine in the first mode and allows rotational movement of and power generation by the engine in the second mode. The zone brake operates in the first mode when the pivoting control bail is in the first position and operates in the second mode when the pivoting control bail is in the second position. A selector mechanism is pivotally coupled to the pivoting control bail and is coupled to the transmission by a first bowden cable and is movable between first and second positions. Movement of the selector mechanism to its second position and movement of the control bail to its second position causes the power transmitting device to transmit power from the engine to the transmission and ground engaging wheel. Movement of either the selector mechanism or the pivoting control bail out of its respective second position stops the transmission of power to the ground engaging wheel.

13 Claims, 4 Drawing Sheets

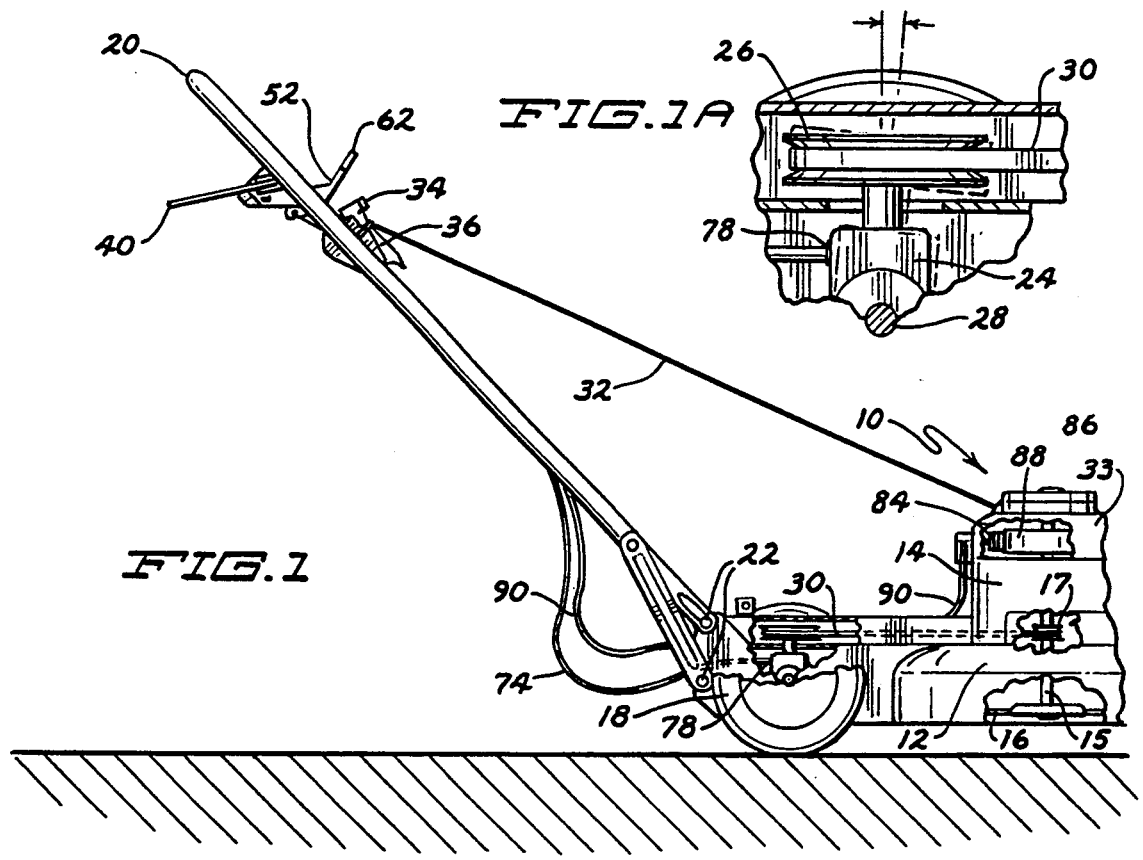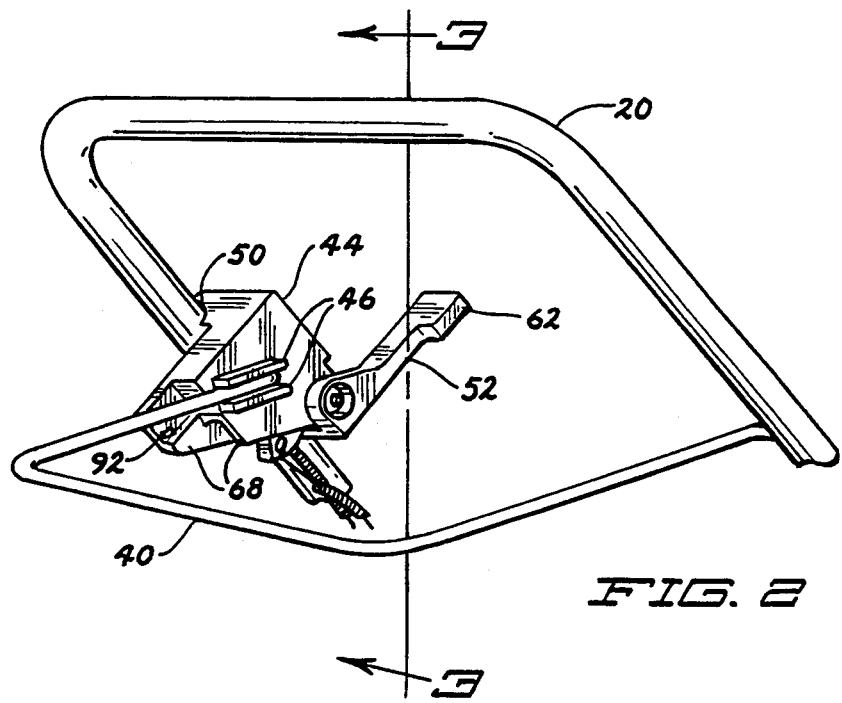

SINGLE BAIL SELF-PROPEL AND ZONE BRAKE CONTROL

TECHNICAL FIELD

This invention pertains to lawn mower self-propel and zone brake control systems. More specifically, this invention pertains to a lawn mower self-propel and zone brake control system that incorporates a single pivoting control bail for controlling the self-propel system as well as the engine and cutting blade zone brake.

BACKGROUND OF THE INVENTION

Power lawn mowers typically incorporate various controls on the mower handlebar for controlling various systems on the mower. For example, one such control might be for controlling the mower engine operating speed. This particular control might include a pivotable lever mounted on the handlebar wherein a portion of the handle is connected to the mower engine speed control lever by a bowden cable. Movement of the lever varies the position of the engine speed control lever which, in turn, varies the actual engine speed. Movement of the pivotable lever might also control the position of the choke butterfly valve within the carburetor.

Another typical control on a mower handlebar might be a pivotable control bail mounted on the handlebar wherein the pivoting bail is connected to a mower self-propel system. Pivoting the control bail from one position to another would engage or disengage the mower self-propel drive system. The self-propel pivoting control bail can be connected to the self-propel engagement system by a bowden cable or a series of interconnected rods. Movement of the bail moves the bowden cable or rods and, thus, engages or disengages the mower self-propel system.

Still another control on a mower handlebar might be another pivotable control bail mounted on the handlebar wherein the pivoting control bail is connected to a mower zone brake system. Zone brake systems are utilized on power rotary lawn mowers to stop the engine and blade in a short period after the operator releases the zone brake pivoting control bail, either intentionally or inadvertently. Movement of the pivoting zone brake control bail to its operating position releases the engine and blade brake and also energizes the engines ignition system. Movement of the pivoting zone brake control bail to its non-operating or braking position brakes the engine and blade and also deenergizes the engine ignition system, stopping the rotating blade within a few seconds. This pivoting control bail is typically connected to the zone brake system by a bowden cable.

If the mower is equipped with a blade brake clutch in lieu of a zone brake, the blade brake clutch is also typically operated by a pivoting control bail mounted on the mower handlebar. Movement of the pivoting control bail engages or disengages the blade brake clutch which, in turn, brakes or releases the rotating cutting blade. The pivoting control bail and the blade brake clutch are usually connected by a bowden cable.

It is highly desirable to have the handlebar controls configured so that the operator can easily control the various systems on the mower. The prior art discloses several versions of control systems and are outlined below. One prior art lawn mower zone brake control system is disclosed in U.S. Pat. No. 5,088,273 issued to Braun et al on Feb. 18, 1992. In Braun, the lawn mower includes a handlebar 14 with a pivoting control bail 20 that is connected to a zone brake system, presumably by a bowden cable (not shown). The zone brake is released when the pivoting control bail 20 is pulled upward to the handlebar 14. When the pivoting control bail 20 is released, the bail swings down and away from the handlebar 14 engaging the zone brake and stopping the blade and the engine. Braun does not disclose a self-propel system.

Another prior art control system is disclosed in U.S. Pat. No. 4,327,539 issued to Bricko et al on May 4, 1982. In Bricko, a single pivoting control arm 10 is pivotally mounted on the mower handlebar 4. The single pivoting control arm 10 is connected to the mower blade brake clutch and to the mower self-propel system. To engage the mower self-propel system, the operator must pivot the arm 10 up and toward the handlebar. To stop the mower self-propel system, the operator must release the control arm 10 which is biased toward the neutral position. To release the blade brake clutch so that the engine can drive the blade, the operator must pivot the control arm 10 down and away to the position shown in FIG. 2 and then pivot the control arm 10 up toward the handlebar 10. As the control arm is pivoted up to the handlebar 10, the blade will begin rotating and the self-propel system will become engaged. If the operator releases the control arm 10, the control arm will return to the position shown in FIG. 1 and the blade brake will stop the rotation of the blade and the self-propel system will be disengaged, stopping the propulsion of the mower. Bricko does not disclose a zone brake system.

Another prior art mower control system is disclosed in U.S. Pat. No. 5,086,890 issued to Turczyn et al on Feb. 11, 1992. Turczyn discloses a lawn mower with a pivoting control bail 2 mounted on a handlebar 4. Pivoting control bail 2 is connected to a zone brake assembly positioned adjacent to the flywheel 26 by a bowden cable 5. When the operator pivots the control bail 2 so that it is parallel with the handlebar 4, the zone brake is released and the ignition circuit is energized. At that point, the engine can be started and the cutting blade will rotate. When the operator releases the control bail 2, it will pivot to the position shown in FIG. 2 and the zone brake will stop the rotation of the engine and blade and will deenergize the ignition circuit. Turczyn does not disclose a self-propel system.

Toro Operator's Manual, Form #3312-248 Rev. A, copyright 1983 to The Toro Company, discloses a prior art lawn mower control system. Page 6 of this manual discloses a lawn mower with a pivoting control bail that is coupled to the handlebar assembly. The handlebar also includes a pivoting plastic stop. The pivoting control bail is connected, by bowden cables, to the mower self-propel system and also to the mower zone brake system. When the operator pivots the control bail up toward the handlebar assembly as shown in FIG. 10, the zone brake is released and the mower engine can be started. However, since the operator must now hold the control bail in that position to start the engine, he winds up having to straddle the gap between the handlebar and the control bail with his hand, which can be uncomfortable. To engage the self-propel system, the operator must rotate the plastic stop counterclockwise as shown in FIG. 11 and then must pivot the control bail further up to engage the self-propel system. If, while running the mower, the operator decides to "feather back" the engagement of the self-propel system (that is, semi-disengage the self-propel system to slow the propulsion speed of the mower), he can simply pivot the control bail slightly away from the handlebar to slip the drive belt in the self-propel system and slow the travel speed of the mower. However, if the operator pivots the control bail too far away from the handlebar, the plastic stop, which is biased in a clockwise direction, will rotate back to the position shown in FIG. 10 and will then prevent the control bail from being pivoted back to the position shown in FIG. 11. That means that the self-propel system is disengaged and cannot be reengaged until the operator rotates the plastic stop counterclockwise as shown in FIG. 11. This particular configuration makes it somewhat difficult for the operator to "feather" the self-propel system in and out since the control bail is subject to being locked out by the plastic stop if it is pivoted too far away from the handlebar. As discussed above, the operator can "feather" the self-propel system in and out to vary the travel speed of the mower by pivoting the control bail toward and away from the handlebar since the control bail is connected to the self-propel system's drive belt tensioning system. By pivoting the control bail, the operator winds up slipping and tightening the drive belt around the sheaves to reduce or increase the speed of the transmission input sheave which, in turn, reduces or increases the travel speed of the mower. In the case of a single speed transmission, this turns out to be the only means for varying the travel speed of the mower except, of course, for varying the speed of the mower engine. Thus, it is important to be able to easily feather the control bail in and out without locking out the self-propel system and without engaging the zone brake which would stop the engine and require restarting it. While this particular system permits such feathering, it does require that the operator exercise great care in not pivoting the control bail too far away from the handlebar which, if done, will lockout the self-propel system and, if it is pivoted away from the handlebar too far, might engage the zone brake which will kill the engine. Furthermore, if the control bail is pivoted too far away from the handlebar and the plastic stop is tripped, the operator will have to rotate the plastic stop again to unlock the self-propel system. Finally, if the operator chooses to operate the mower in a non-self-propel mode, then he cannot pivot the control bail all the way to the handlebar and must hold the control bail in the position shown in FIG. 10 which requires that the operator's hand straddle the gap between the control bail and the handlebar. This, of course could become quite uncomfortable after some time.

Another prior art lawn mower control system is disclosed in the Toro Operator's Manual, Form No. 3314-941, copyright to The Toro Company in 1991. In FIGS. 6 through 8 on page 6 of this manual, a lawnmower with a pivoting control bail coupled to the handlebar assembly is disclosed. A throttle control and a ground speed control are also pivotally coupled to the handlebar assembly. The control bail is coupled to the self-propel system and the zone brake by bowden cables. The ground speed control is also coupled to the self-propel system by a separate bowden cable. To start the mower, the operator must pivot the control bail up to the handlebar assembly to the run/drive position shown in FIG. 8. In this position, the zone brake is released and the mower can be started. To engage the self-propel system, the operator must then pivot the control bail slightly away from the handlebar to the run/shift position as shown in FIG. 8. At this point, the operator must pivot the ground speed control out of its neutral position and into one of three propel speeds. Then the operator must pivot the control bail to the run/drive position as shown in FIG. 8. From this point on, the operator can "feather" the self-propel system in and out of engagement by pivoting the control bail between the run/drive position and the run/shift positions. This "feathering" has the effect of slipping or tightening the drive belt between the engine and the transmission sheaves so as to increase or decrease the travel speed of the lawn mower. To disengage the self-propel system, the operator must pivot the control bail to the run/shift position, which will slip the drive belt enough to stop propulsion. The operator should also pivot the ground speed control back to its neutral position at that point. The operator can then either release the control bail completely to stop the mower engine or can choose to continue mowing by placing the control bail back in the run/drive position which will keep the engine and cutting blade running without the self-propel system engaged since the ground speed control is in neutral.

The present invention offers an alternate lawn mower zone brake and self-propel system. In particular, a preferred lawn mower zone brake and self-propel system according to the present invention incorporates a mower deck, a prime mover mounted on the deck, a cutting blade rotatably coupled to the prime mover, a ground engaging wheel rotatably coupled to and supporting the deck, a handlebar assembly operatively coupled to the deck, a pivoting control bail pivotally mounted on the handlebar assembly and pivotable between first and second positions, a power transmitting device connecting the prime mover and the transmission, a zone brake operatively coupled to the prime mover and to the pivoting control bail wherein the zone brake operates in either a first or a second mode and wherein the zone brake inhibits rotational movement of and power generation by the prime mover in the first mode and wherein the zone brake allows rotational movement of and power generation by the prime mover in the second mode wherein the zone brake operates in the first mode when the pivoting control bail is in the first position and operates in the second mode when the pivoting control bail is in the second position, and a selector mechanism movably coupled to the pivoting control bail and coupled to the transmission by a first bowden cable wherein the selector mechanism is movable between a first and a second position and wherein movement of the selector mechanism to its second position and movement of the pivoting control bail to its second position causes the power transmitting device to transmit power from the prime mover to the transmission and the ground engaging wheel and wherein movement of either the selector mechanism or the pivoting control bail out of its respective second position stops the transmission of power through the power transmitting device from the prime mover to the transmission and ground engaging wheel.

SUMMARY OF THE INVENTION

The present invention includes an improved lawn mower self-propel and zone brake control system.

Specifically, this invention includes, in an improved lawn mower self-propel and zone brake control system, a deck, a prime mover mounted on the deck, a cutting blade rotatably coupled to the prime mover, a ground engaging wheel rotatably coupled to and supporting the deck, a handlebar assembly operatively coupled to the deck, a transmission operatively coupled to the ground engaging wheel, a pivoting control bail pivotally mounted on the handlebar assembly wherein the control bail is pivotable between first and second positions, a power transmitting device connecting the prime mover and the transmission, a zone brake operatively coupled to the prime mover and the pivoting control bail wherein the zone brake operates in either a first or a second mode and wherein the zone brake inhibits rotational movement of and generation of power by the prime mover in the first mode and wherein the zone brake allows rotational movement of and power generation by the prime mover in the second mode wherein the zone brake operates in its first mode when the pivoting control bail is in the first position and operates in its second mode when the pivoting control bail is in its second position, and a selector mechanism movably coupled to the pivoting control bail and coupled to the transmission by a first bowden cable wherein the selector mechanism is movable between a first and a second position and wherein movement of the selector mechanism to its second position and movement of the pivoting control bail to its second position causes the power transmitting device to transmit power from the prime mover to the transmission and ground engaging wheel and wherein movement of either the selector mechanism or the pivoting control bail out of its respective second position stops the transmission of power through the power transmitting device from the prime mover to the transmission and ground engaging wheel.

The lawn mower self-propel and zone brake control system can include a selector mechanism that is pivotally coupled to the pivoting control bail.

The lawn mower self-propel and zone brake control system can include a power transmitting device that is a flexible drive belt.

The lawn mower self-propel and zone brake control system can include a prime mover that is an internal combustion engine that includes a power output sheave.

The lawn mower self-propel and zone brake control system can include a transmission that has a power input sheave and an output shaft.

The lawn mower self-propel and zone brake control system can include a drive belt that is entrained about the power output sheave and the power input sheave.

The lawn mower self-propel and zone brake control system can include a first bowden cable that operates to pivot the transmission about the output shaft from a disengaged position to an engaged position wherein the drive belt is tightened about the output sheave and the input sheave as the transmission is pivoted to the engaged position permitting transmission of power from the output sheave to the input sheave through the drive belt when the selector mechanism and the pivoting control bail are both pivoted to their respective second positions and wherein the first bowden cable operates to pivot the transmission from an engaged position to a disengaged position to loosen the drive belt from the output sheave and the input sheave stopping transmission of power from the output sheave to the input sheave through the drive belt when either the selector mechanism or the pivoting control bail are pivoted out of its respective second position.

The lawn mower self-propel and zone brake control system can include a pivoting control bail and zone brake that are connected by a second bowden cable.

The lawn mower self-propel and zone brake control system can include a selector mechanism that includes a selector mechanism base that includes a pivot stop for the pivoting control bail.

The lawn mower self-propel and zone brake control system can include a selector mechanism base that is snap-fit onto the pivoting control bail.

The lawn mower self-propel and zone brake control system can include a pivoting control bail wherein gradual movement of the pivoting control bail away from its second position when the selector mechanism is in its second position gradually pivots the transmission about the output shaft from its engaged position to its disengaged position and gradually loosens the drive belt from the output and input sheaves and gradually reduces the amount of power transmitted from the output sheave to the input sheave so as to gradually reduce the propulsion speed of the ground engaging wheel.

The lawn mower self-propel and zone brake control system can include a selector mechanism wherein gradual movement of the selector mechanism away from its second position when the pivoting control bail is in its second position gradually pivots the transmission about the output shaft from its engaged position to its disengaged position and gradually loosens the drive belt from the output and input sheaves and gradually reduces the amount of power transmitted from the output sheave to the input sheave so as to gradually reduce the propulsion speed of the ground engaging wheel.

The lawn mower self-propel and zone brake control system can include a zone brake that begins operating in its second mode when the pivoting control bail is pivoted toward the second position but before the pivoting control bail has completely reached its second position.

BRIEF DESCRIPTION OF THE DRAWING

The invention will be further described with reference to the appended drawing, wherein:

FIG. 1 is a partial right side elevational view of a lawn mower with the preferred self-propel and zone brake control system according to the present invention.

FIG. 1A is a partial side elevational view of the preferred control system of FIG. 1.

FIG. 2 is a partial perspective view of the preferred control system of FIG. 1.

DETAILED DESCRIPTION OF THE PREFERRED EMBODIMENT

Figure 3:
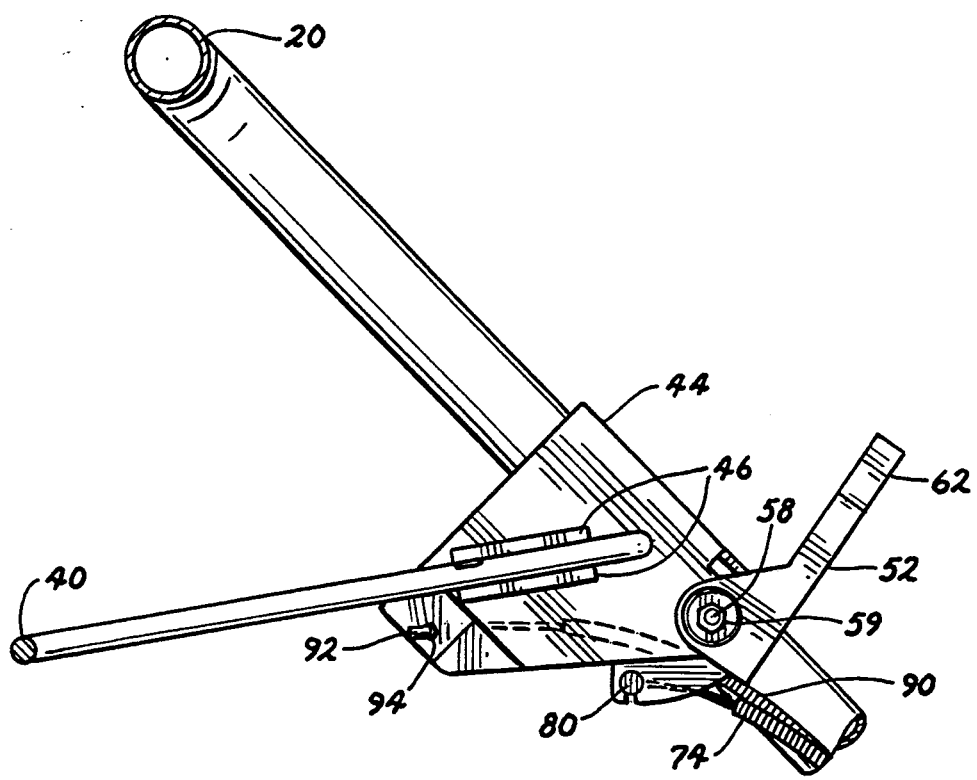
FIG. 3 is a partial right side cross-sectional view of the preferred control system of FIG. 1.

In the Drawing, wherein like reference numerals designate like parts and assemblies throughout the several views, FIGS. 1 and 1A show a preferred lawn mower 10 with an internal combustion engine 14 mounted on a mowing deck 12. A cutting blade 16 is attached to the crankshaft 15 of the engine 14 at the lower end of the crankshaft 15. The mowing deck 12 is supported by a set of ground engaging wheels 18, one or more of which is typically driven by the self-propel system. A handlebar assembly 20 is attached to the deck 12 at points. A self-propel transmission 24 is mounted beneath the deck 12 toward the rear of the mower 10. The transmission 24 has a power input sheave 26 and a power output shaft 28 about which the transmission pivots and through which output power is transmitted to the rear ground engaging wheels 18. A flexible drive belt 30 is entrained about the power input sheave 26 and a power output sheave 17 on the crankshaft 15 of the engine 14. A starter rope 32 is connected to the engine recoil assembly 33 for starting the engine. The end of the starter rope 32 has a grip handle 34 that is engaged and retained by a starter rope retainer 36 which is mounted on the handlebar 20.

Figure 4:
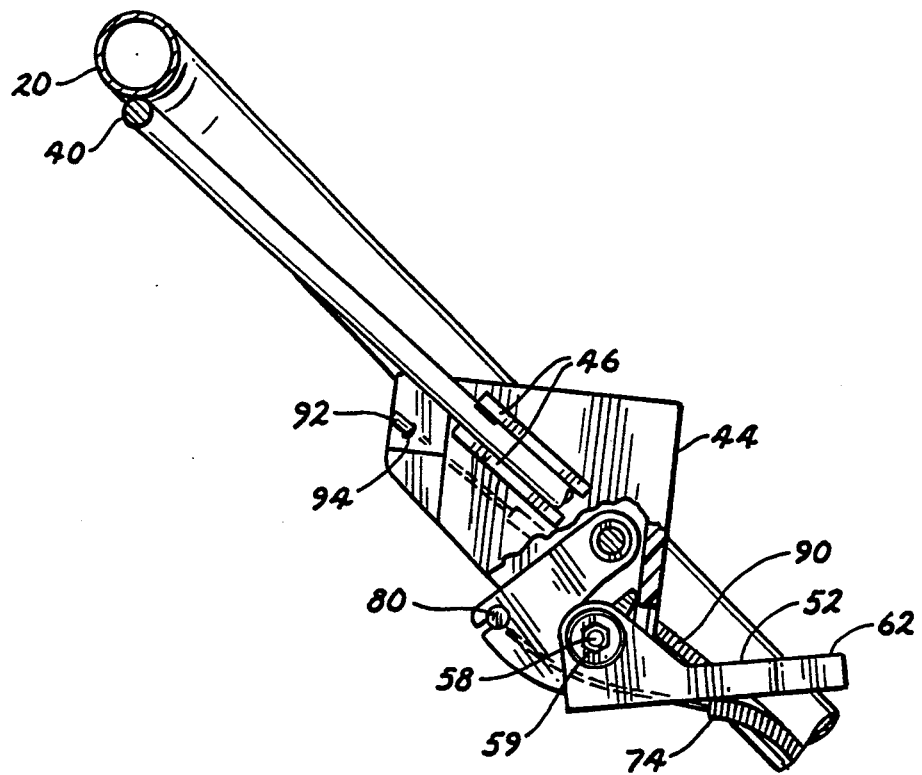
FIG. 4 is a partial right side cross-sectional view of the preferred control system of FIG. 1.
Figure 6:
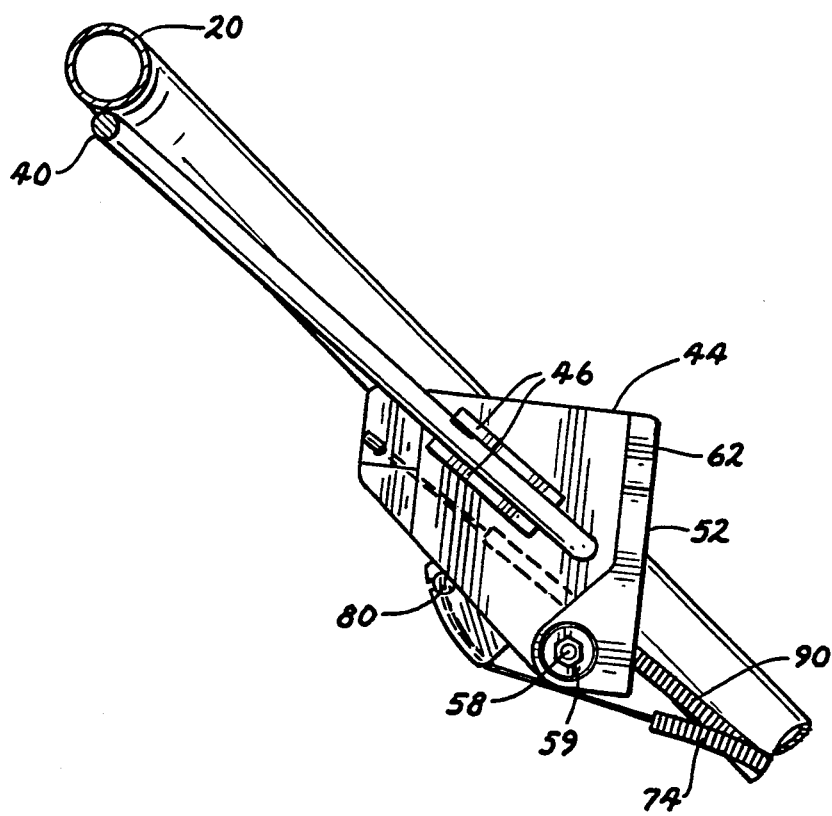
FIG. 6 is a partial right side cross-sectional view of the preferred control system of FIG. 1.
Figure 7:
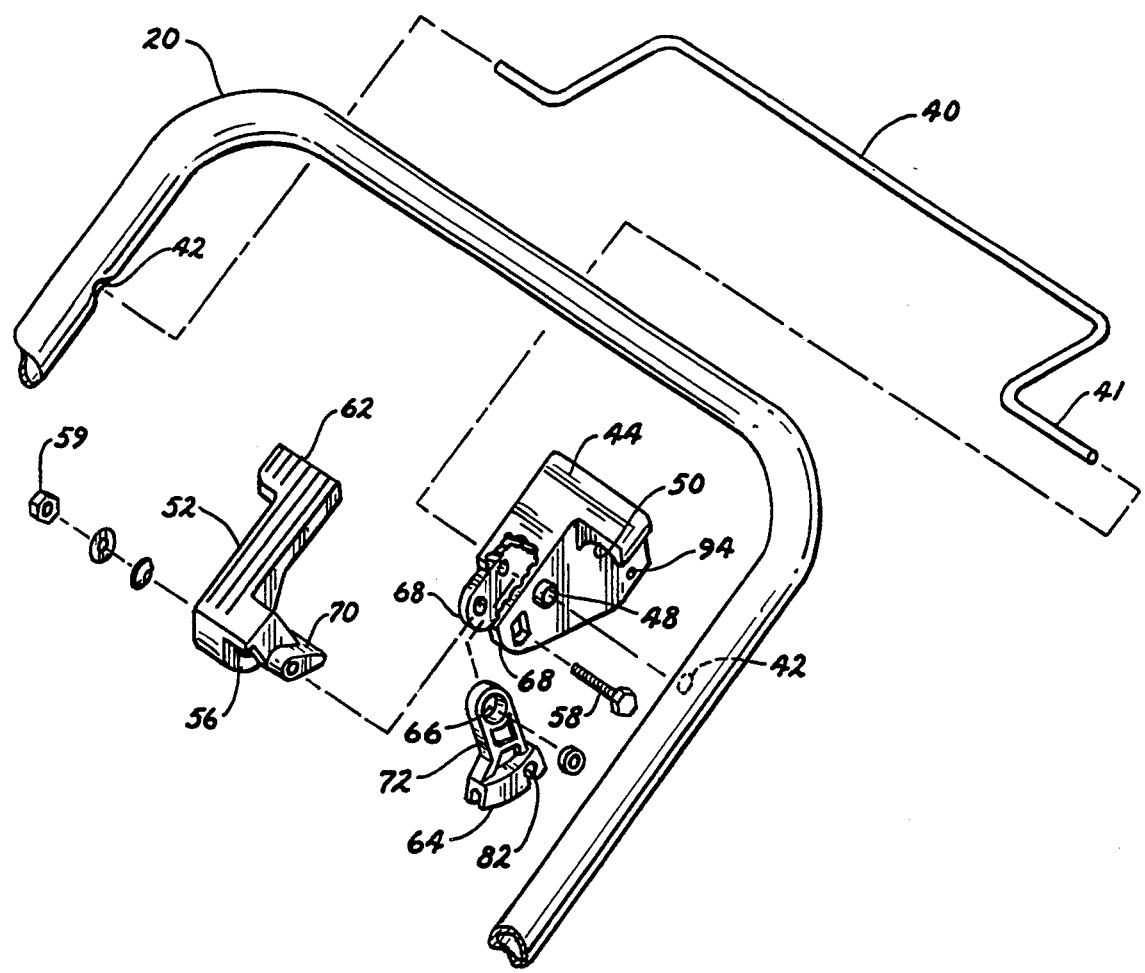
FIG. 7 is an exploded view of the preferred control system of FIG. 1.

A pivoting control bail 40 is pivotally mounted on the handlebar 20 in pivot holes 42. The control bail 40 is pivotable between two positions. The first position is shown in FIGS. 2 and 3 while the second position is shown in FIGS. 4 and 6. The control bail 40 is biased to the first position by means that will be described in more detail below.

As shown in FIGS. 2 through 7, a plastic selector mechanism base 44 is snap fit onto the control bail 40 through the use of resilient ears 46 that are spaced apart such that the control bail 40 can be snap-fit into the ears 46 of the selector mechanism base 44. Selector mechanism base 44 also includes two legs 68 each including a hole 48 (one shown in FIG. 7) that the control bail 40 can pass through so that the selector mechanism base 44 is adequately engaged, restrained, and aligned on the control bail 40 when it is snap-fit onto the control bail 40. The portion 41 of the control bail 40 that protrudes out through the hole 48 of the selector mechanism base 44 can then be placed in the left hand pivot hole 42 of the handlebar 20. Surface 50 of the selector mechanism base 44 acts as a pivot stop for the downward pivoting motion of the control bail as shown in FIG. 2. Surface 50 engages the handlebar 20 when the pivoting control bail 40 is in its downward position and stops any further downward motion of the control bail 40.

Selector mechanism 52 is pivotally coupled to the selector mechanism base 44 by a bolt 58 and a nut 59 that are passed through a hole 56 in the selector mechanism 52. Selector mechanism 52 pivots about the bolt 58 so that, in effect, the selector mechanism 52 is pivotally coupled to the pivoting control bail 40. Selector mechanism 52 is tightly secured to the selector mechanism base 44 by the bolt 58 and the nut 59 so that it can be pivoted with the application of a moderate amount of force but is not so loose that it will flop back and forth on its own. Selector mechanism 52 includes a handle 62 that the operator can grip for moving the selector mechanism back and forth. Of course, since the selector mechanism base 44 is snap-fit onto the pivoting control bail 40, the selector mechanism base 44 and the selector mechanism 52 pivot with the control bail 40 when it is pivoted.

A bellcrank mechanism 64 includes a hole 66 that is sized so that the bellcrank mechanism 64 can fit over and pivot on the left leg 41 of the pivoting control bail 40. The bellcrank mechanism 64 is mounted on the left leg 41 of the control bail 40 so that it pivots between the legs 68 of the selector mechanism base 44. This, of course, means that the bellcrank mechanism 64 must be placed between the legs 68 of the selector mechanism base 44 before the selector mechanism base 44 and the bellcrank mechanism 64 are slid over the left leg of the control bail 40 as the selector mechanism base 44 is being aligned to be snap-fit onto the control bail 40. Once the resilient ears 46 of the selector mechanism base 44 have engaged and snapped onto the control bail 40, the selector mechanism base 44 and the bellcrank mechanism 64 are then properly engaged and aligned so that the bellcrank mechanism 64 is free to pivot on the left leg of the control bail 40, at least to the extent allowed by the other interconnected elements that will be described below.

The selector mechanism 52 also includes a cam surface 70 located near the bottom end of the selector mechanism 52. The cam surface 70 is positioned on the selector mechanism 52 so that, when the selector mechanism is pivoted about the selector mechanism base 44, and, of course, relative to the pivoting control bail 40, the cam surface 70 engages the bellcrank mechanism 64 at surface 72 and causes the bellcrank mechanism 64 to pivot about the left leg of the control bail 40 and relative to the selector mechanism base 44.

A first bowden cable 74 has its lower end connected to the transmission 24 at point 78. The means for fastening the lower end of the first bowden cable 74 to the transmission 24 can be a screw type clamp or other suitable fastening device. The upper end of the first bowden cable 74 is connected to the bellcrank mechanism 64 by a cable end pin 80 that is sized to fit snugly within an opening 82 in the bellcrank mechanism 64.

The transmission 24 in the preferred embodiment is a single speed transmission without any internal neutral and is designed to pivot fore and aft about the power output shaft 28. FIG. 1A shows the approximate range of pivoting for the transmission 24. When the transmission 24 is pivoted aft, the flexible drive belt 30 is tightened about the power output sheave 17 and the power input sheave 26 to the point where the drive belt 30 can transmit power from the internal combustion engine 14 to the transmission. When the transmission 24 is pivoted in a forward direction, the drive belt 30 is loosened about the power output sheave 17 and the power input sheave 26 resulting in the cessation of power transmission from the engine 14 to the transmission 24. Any power transmitted to the transmission 24 will be sent to the rear ground engaging wheels 18 which, in turn, will drive the mower 10 over the area to be mowed. Power is transmitted from the transmission 24 to the ground engaging wheels 18 via the power output shaft 28.

Figure 5:
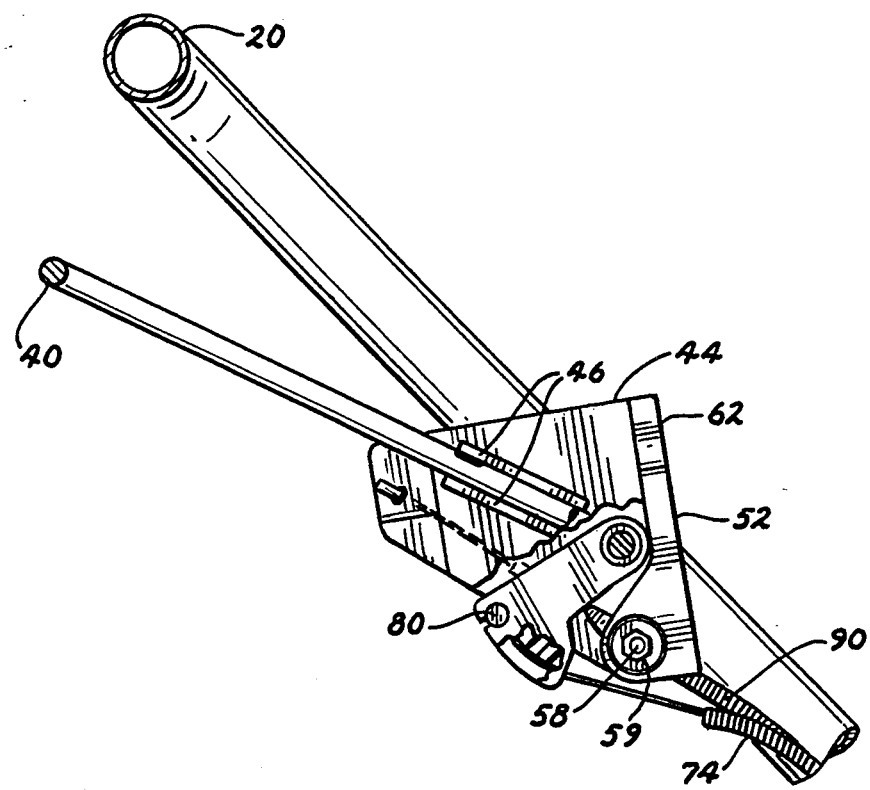
FIG. 5 is a partial right side cross-sectional view of the preferred control system of FIG. 1.

To tighten the flexible drive belt 30 about the power output sheave 17 and the power input sheave 26 to the point where power will be transmitted through the drive belt 30, the operator must pivot the control bail 40 to its uppermost position as shown in FIGS. 4 and 6. Furthermore, the operator must pivot the selector mechanism 52 to its farthest rearward position as shown in FIGS. 5 and 6. The combination of the control bail 40 in its uppermost position and the selector mechanism 52 in its farthest rearward position results in the drive belt 30 being drawn to its tightest possible position about the output and input sheaves 17 and 26, respectively. Movement of either the control bail 40 or the selector mechanism 52 away from the positions shown in FIG. 6 will result in a loosening of the drive belt 30 about the sheaves 17 and 26. The tightening and loosening is achieved as follows.

As discussed above, the first bowden cable 74 is connected at its upper end to the bellcrank mechanism 64 and at its lower end to the transmission 24. When the inner cable or moving element of the first bowden cable 74 is displaced in an upward direction as a result of movement of the bellcrank opening 82 and the mating cable end pin 80 in an upward direction, the transmission 24 will be rocked backward about the output shaft 28, resulting in the belt 30 tightening as described above. Conversely, when the inner cable or moving element of the first bowden cable 74 is displaced in a downward direction as a result of movement of the bellcrank opening 82 and the mating cable end pin 80 in a downward direction, the transmission will be rocked forward about the output shaft 28 resulting in the belt loosening as described above. Movement of the bellcrank opening 82 and the mating cable end pin 80 in an upward direction is accomplished when the control bail 40 and/or the selector mechanism 52 are pivoted upward or rearward, respectively. The bellcrank opening 82 and the mating cable end pin move in an upward direction whenever the pivoting control bail 40 is pivoted up toward the handlebar 20 and/or whenever the selector mechanism 52 is moved in a rearward direction. Movement of the pivoting control bail 40 in an upward direction causes upward movement of the bellcrank opening 82 and the mating cable end pin 80 due to the fact that the bellcrank mechanism 64, the selector mechanism 52, and the selector mechanism base 44 all pivot with the control bail. Movement of the selector mechanism 52 in a rearward direction also causes upward movement of the bellcrank opening 82 and the mating cable end pin 80 since the movement of the selector mechanism 52 causes movement of the camsurface 70 to engage surface 72 of the bellcrank mechanism 64 which, in turn, causes the bellcrank mechanism 64 to pivot about the left leg of the control bail 40, thus causing the bellcrank opening 82 and the mating cable end pin 80 to move in an upward direction. Again, movement of either the pivoting control bail 40 in an upward direction or the selector mechanism 52 in a rearward direction will cause the bellcrank opening 82 and the mating cable end pin 80 to move in an upward direction. The absolute highest point for the bellcrank opening 82 and the mating cable end pin 80 will be achieved only when the pivoting control bail 40 is pivoted to its highest position and the selector mechanism 52 is moved to its most rearward position. If either the pivoting control bail 40 or the selector mechanism 52 is moved from its extreme upward or rearward position, respectively, the bellcrank opening 82 and the mating cable end pin 80 will move in a downward direction. Drive belt 30 will be drawn tightest about the power output sheave 17 and the power input sheave 26 when the pivoting control bail 40 is in its most upward position and the selector mechanism 52 is in its most rearward position. Movement of either or both of those two elements out of those positions will result in a loosening of the belt around the power output sheave 17 and the power input sheave 26. Loosening of the belt around those two sheaves will result in increased belt slip and reduced power transmission between the two sheaves which, ultimately, will result in a reduction of power delivered through the transmission 24 to the ground engaging wheels 18. That, of course, will result in a reduced travel speed of the mower 10. If the control bail 40 is in its most downward position as shown in FIGS. 2 and 3, or if the selector mechanism 52 is in its most forward position as shown in FIGS. 2, 3, and 4, the drive belt 30 will be loosened to the point where no power is transmitted between the output sheave 17 and the input sheave 26 and the propulsion of the mower 10 will stop. Propulsion will resume and travel speed of the mower will gradually increase as the control bail 40 and the selector mechanism 52 are moved back toward their respective positions as shown in FIG. 6. Full travel speed will be achieved only when the pivoting control bail 40 is in its most upper position and the selector mechanism 52 is in its most rearward position.

The engine 14 includes a zone brake 84 that is positioned adjacent to the engine flywheel 88 within the engine housing 86. The zone brake is of typical construction and is operable in a first and second mode. In the first mode, the zone brake 84 engages the flywheel 88 inhibiting rotational motion of and power generation by the engine 14. In its second mode, the zone brake 84 is released from the flywheel 88 and permits rotational motion of and power generation by the engine 14. The zone brake 84 is biased to its first position by a spring (not shown). A second bowden cable 90 connects the zone brake 84 and the selector mechanism base 44. Second bowden cable 90 is attached to the selector mechanism base 44 by a cable end 92 that fits snugly within a hole 94 in the selector mechanism base 44. The lower end of the second bowden cable 90 attaches to the zone brake 84 which is biased toward the flywheel 88.

When the pivoting control bail 40 is in its most downward position, the zone brake 84 is in its first mode. Since the zone brake 84 is biased to its first mode, the control bail 40 is biased to its downward position. It should also be noted here that the transmission 22 is biased to pivot to its fore position which furthers the biasing forces on the control bail 40 which is indirectly connected to the transmission 22 by the first bowden cable 74.

Operation of the preferred lawn mower self-propel and zone brake control system of the present invention is as follows. When the operator approaches the mower 10 to begin mowing, the controls should be in the position as shown in FIGS. 1, 2, and 3. To start the mower engine 14, the operator must lift the control bail 40 to its uppermost position as shown in FIG. 4. The selector mechanism 52 remains in its forward position as shown in FIG. 4. By lifting the control bail 40 to its uppermost position as shown in FIG. 4, the zone brake 84 is released from the flywheel 88 and clears the way for rotation of and power generation by the engine 14. This pivoting of the control bail 40 causes the second bowden cable 90 to pull the zone brake 84 away from the flywheel 88. The interconnection of the control bail 40 and the zone brake 84 are described in detail above. Once the operator has placed the control bail 40 in the upper position, the engine 14 can be started by grasping the starter rope 32 grip handle 34 and pulling the starter rope 32 so that the engine 14 begins to rotate and starts to run. The cutting blade 16 rotates with the engine 14 so, once the engine 14 has started to run, the operator can begin cutting grass although there will be no self-propel assist available to the operator without further manipulation of the controls as will be described in detail below. However, it is often desirable to mow without the self-propel system engaged. For example, if one needs to mow closely around trees and shrubbery, it is usually easier to mow with the self-propel system disengaged. The same is true if one needs to mow in an area where it is necessary to push and pull the mower back and forth frequently. This would be true in areas that have no long straightaway areas over which the mower can be guided.

If the operator wants to engage the self-propel system on the preferred lawn mower of the present invention, then the engagement of the self-propel system is as follows. After the operator has started the engine 14 in the manner described above, the operator can engage the self-propel system by pivoting the control bail 40 slightly down and away from the handlebar 20 to the position shown in FIG. 5. By pivoting the control bail 40 to that position, the zone brake 84 remains in the unengaged position so that rotational movement of and power generation by the engine 14 is not inhibited. That is, limited pivoting of the control bail 40 in a downward direction will not move the second bowden cable 90 enough to engage the zone brake 84 against the flywheel 88. The operator must then pull the selector mechanism 52 from its forward position as shown in FIGS. 1, 2, and 3 to its rearward position as shown in FIGS. 5 and 6. This movement of the selector mechanism 52 cause the bellcrank mechanism 64 to rotate which, in turn, causes the first bowden cable 74 to be pulled in an upward direction. That causes the transmission 24 to pivot in a rearward direction which causes the drive belt 30 to tighten about the power output sheave 17 and the power input sheave 26. However, the drive belt 30 is not yet drawn tightly enough about the two sheaves 17 and 26 to transmit power between them. Therefore, the mower 10 will not yet be propelled by the transmission 24 since no power is delivered to it by the drive belt 30. Now, to tighten the belt 30 further to the point where power will be transmitted between the sheaves 17 and 26, the operator must pivot the control bail 40 back up to its upper position as shown in FIG. 6. As the operator pivots the bail 40 back up to its highest position, the selector mechanism 52, selector mechanism base 44, and bellcrank mechanism 64 are all pivoted in an upward direction along with the control bail 40. Since the first bowden cable 74 is connected to the bellcrank 64, it will move in an upward direction when the control bail 40 is pivoted upward. This further upward movement of the first bowden cable 74 will cause the transmission 24 to pivot further in a rearward direction which will further tighten the drive belt 30 to the point where power is transmitted between sheaves 17 and 26. When the belt 30 is tight enough to transmit power between the sheaves 17 and 26, the mower 10 will be propelled.

The drive belt 30 will be drawn most tightly about the two sheaves 17 and 26 when the selector mechanism 52 is in its most rearward position and the control bail 40 is in its uppermost position. If the operator pivots the control bail 40 down at all from its highest position, as shown in FIG. 6, the belt 30 will begin to loosen about the sheaves 17 and 26 and power transmission will be reduced since the belt 30 will begin to slip around the sheaves. If the operator pivots the control bail 40 down to the point shown in FIG. 5, the belt 30 will become so loose that the transmission of power between the sheaves will stop. Movement of the control bail 40 between the positions shown in FIGS. 5 and 6 will tighten and loosen the belt so as to increase or decrease the speed of the mower 10. This technique of speed adjustment with the control bail 40 is commonly known as "feathering" the transmission 22 so as to adjust the mower speed with a single speed transmission. "Feathering" is also useful when the operator wants to engage the mower propulsion system when the mower is at a dead stop. "Feathering" in the transmission will gradually increase the mower speed and will prevent the mower from jumping forward or "jackrabbiting" away from the operator. The operator can also "feather" the mower speed by pivoting the selector mechanism 52 fore and aft a small amount while holding the control bail 40 in its uppermost position. For example, the operator could choose to pivot the selector mechanism 52 from its position shown in FIG. 6 to a more forward position somewhere between the position shown in FIG. 6 and the position shown in FIG. 4. Movement of the selector mechanism 52 within that range would have the effect of loosening and tightening the belt 30 just enough to increase or reduce the travel speed without loosening the belt 30 so much that propulsion of the mower 10 stops. As discussed earlier, pivoting the selector mechanism 52 causes the bellcrank mechanism 64 to pivot which, in turn, causes an upward or downward movement of the first bowden cable 74 causing the transmission 24 to rock aft or fore which causes the drive belt 30 to tighten or loosen, respectively. Practically speaking, the operator will probably choose to "feather" the transmission by using the control bail 40 rather than the selector mechanism 52 since, during normal operation, the operator will already have his hands around the handlebar 20 and the control bail 40.

To stop the propulsion of the mower 10, the operator can simply pivot the control bail 40 down to the point shown in FIG. 5 or can keep the control bail 40 in its uppermost position while pivoting the selector mechanism 52 forward to the point shown in FIG. 4. If the operator chooses to stop the mower engine 14 and the blade 16, the operator can release the control bail 40 which will automatically return to its most downward position.

The preferred embodiment of the present invention that is described in detail above has several operating advantages. First, the operator can control the self-propel system and the zone brake 84 by manipulating one pivoting control bail 40. Second, the operator can "feather" the self-propel system in and out of engagement so as to provide a range of travel speeds for the mower 10 even though the mower 10 utilizes a single speed transmission 24. Third, the operator can operate the mower 10 with or without the self-propel system engaged and can disengage and re-engage the self-propel system by simply pivoting a control bail 40 or a selector mechanism 52 through a range of movement that is easily within the grip of the operator, even though the transmission 24 has no internal neutral. Fourth, the operator can "feather" the transmission 24 with either the pivoting control bail 40 or the selector mechanism 52. Fifth, the operator can start the mower engine 14 without engaging the self-propel system by holding the control bail 40 tightly against the handlebar 20 while positioning the selector mechanism 52 to its forwardmost location.

The preferred embodiment of the present invention also provides certain manufacturing economies. First, the zone brake 84 and self-propel control system require only one pivoting control bail 40. Second, the selector mechanism 52, selector mechanism base 44, pivoting control bail 40 and handlebar assembly 20 are all easily assembled since the selector mechanism base 44 is snap-fit onto the control bail 40 and the control bail 40 merely mounts in and pivots about a set of holes 42 formed in the handlebar 20. Third, the selector mechanism base 44, which snap-fits onto the handlebar 20, acts as a pivot stop for the control bail 40. Most importantly, the entire control mechanism assembles with a minimum number of fasteners required.

A preferred embodiment of the invention is described above. Those skilled in the art will recognize that many embodiments are possible within the scope of the invention. Variations and modifications of the various parts and assemblies can certainly be made and still fall within the scope of the invention. Thus, the invention is limited only to the apparatus recited in the following claims, and equivalents thereof.

I claim:

1. In a walk behind power lawn mower, a lawn mower self-propel and zone brake control system comprising:
   (a) a deck;
   (b) a prime mover mounted on said deck;
   (c) a cutting blade rotatably coupled to said prime mover;
   (d) a ground engaging wheel rotatably coupled to and supporting said deck;
   (e) a handlebar assembly operatively coupled to said deck;
   (f) a transmission operatively coupled to said ground engaging wheel;
   (g) a pivoting control bail pivotally mounted on said handlebar assembly, said control bail pivotable between first and second positions;
   (h) a power transmitting device connecting said prime mover and said transmission;
   (i) a zone brake operatively coupled to said prime mover and to said pivoting control bail wherein said zone brake operates in either a first or a second mode and wherein said zone brake inhibits rotational movement of and generation of power by said prime mover in said first mode and wherein said zone brake allows rotational movement of and power generation by said prime mover in said second mode, said zone brake operating in said first mode when said pivoting control bail is in said first position and said zone brake operating in said second mode when said pivoting control bail is in said second position; and
   (j) a selector mechanism movably coupled to said pivoting control bail and coupled to said transmission by a first bowden cable wherein said selector mechanism is movable between a first and a second position and wherein movement of said selector mechanism to its said second position and movement of said pivoting control bail to its said second position causes said power transmitting device to transmit power from said prime mover to said transmission and said ground engaging wheel and wherein movement of either said selector mechanism or said pivoting control bail out of its respective second position stops the transmission of power through said power transmitting device from said prime mover to said transmission and said ground engaging wheel.

2. The lawnmower self-propel and zone brake control system of claim 1, wherein said selector mechanism is pivotally coupled to said pivoting control bail.

3. The lawn mower self-propel and zone brake control system of claim 2, wherein said power transmitting device comprises a flexible drive belt.

4. The lawn mower self-propel and zone brake control system of claim 3, wherein said prime mover comprises an internal combustion engine and a power output sheave.

5. The lawnmower self-propel and zone brake control system of claim 4, wherein said transmission further comprises a power input sheave and an output shaft.

6. The lawn mower self-propel and zone brake control system of claim 5, wherein said drive belt is entrained about said power output sheave and said power input sheave.

7. The lawn mower self-propel and zone brake control system of claim 6, wherein said first bowden cable operates to pivot said transmission about said output shaft from a disengaged position to an engaged position wherein said drive belt is tightened about said output sheave and said input sheave as said transmission is pivoted to said engaged position permitting transmission of power from said output sheave to said input sheave through said drive belt when said selector mechanism and said pivoting control bail are both pivoted to their respective second positions and wherein said first bowden cable operates to pivot said transmission from said engaged position to said disengaged position to loosen said drive belt from said output sheave and said input sheave stopping transmission of power from said output sheave to said input sheave through said drive belt when either said selector mechanism or said pivoting control bail are pivoted out of its respective second position.

8. The lawn mower self-propel and zone brake control system of claim 7, wherein said pivoting control bail and said zone brake are connected by a second bowden cable.

9. The lawn mower self-propel and zone brake control system of claim 8, wherein said selector mechanism further comprises a selector mechanism base comprising a pivot stop for said pivoting control bail.

10. The lawn mower self-propel and zone brake control system of claim 9, wherein said selector mechanism base is snap-fit onto said pivoting control bail.

11. The lawn mower self-propel and zone brake control system of claim 10, wherein gradual movement of said pivoting control bail away from said second position when said selector mechanism is in said second position gradually pivots said transmission about said output shaft from said engaged position to said disengaged position and gradually loosens said drive belt from said output and input sheaves and gradually reduces the amount of power transmitted from said output sheave to said input sheave so as to gradually reduce the propulsion speed of said ground engaging wheel.

12. The lawn mower self-propel and zone brake control system of claim 11, wherein gradual movement of said selector mechanism away from said second position when said pivoting control bail is in said second position gradually pivots said transmission about said output shaft from said engaged position to said disengaged position and gradually loosens said drive belt from said output and input sheaves and gradually reduces the amount of power transmitted from said output sheave to said input sheave so as to gradually reduce the propulsion speed of said ground engaging wheel.

13. The lawn mower self-propel and zone brake control system of claim 12, wherein said zone brake begins operating in said second mode when said pivoting control bail is pivoted toward said second position but before said pivoting control bail has completely reached said second position.

* * * * *